United States Patent
Brown

(10) Patent No.: US 7,131,324 B2
(45) Date of Patent: Nov. 7, 2006

(54) PARTIAL STROKE VALVE TEST APPARATUS

(75) Inventor: Raymond Brown, Danbury (GB)

(73) Assignee: ICS Triplex Technology Limited (GB)

( * ) Notice: Subject to any disclaimer, the term of this patent is extended or adjusted under 35 U.S.C. 154(b) by 146 days.

(21) Appl. No.: 10/892,016

(22) Filed: Jul. 15, 2004

(65) Prior Publication Data

US 2005/0016254 A1    Jan. 27, 2005

(30) Foreign Application Priority Data

Jul. 25, 2003    (GB) ................. 0317382.0

(51) Int. Cl.
*G01M 19/00* (2006.01)
(52) U.S. Cl. ........................................ 73/168
(58) Field of Classification Search ................ 73/1.72, 73/168
See application file for complete search history.

(56) References Cited

U.S. PATENT DOCUMENTS

| | | | |
|---|---|---|---|
| 5,057,699 A | 10/1991 | Spence | 307/98 |
| 6,112,765 A | 9/2000 | Boyer | 137/554 |
| 2002/0108436 A1 | 8/2002 | Albuaijan | 73/168 |
| 2003/0136929 A1 | 7/2003 | Clemens et al. | 251/129.4 |

FOREIGN PATENT DOCUMENTS

| | | |
|---|---|---|
| GB | 2338051 | 12/1999 |
| GB | 2346672 | 8/2000 |
| GB | 2372087 | 8/2002 |

OTHER PUBLICATIONS

UK Patent Search Report for Application No. GB 0317382.0.

*Primary Examiner*—Robert Raevis
(74) *Attorney, Agent, or Firm*—Bourque & Associates, P.A.

(57) ABSTRACT

This invention relates to an emergency valve shutdown system having an integrated test facility. The invention provides an apparatus for testing emergency shutdown valves in a process industry comprising: a valve having a plurality of limit switches each limit switch arranged to indicate that the valve has reached a corresponding one of a plurality of predetermined valve positions; a valve monitor module arranged to send a signal to said valve to initiate movement of said valve and to receive feedback relating to said limit switches; wherein said feedback is provided via a single feedback signal between the valve and the valve monitor module.

4 Claims, 7 Drawing Sheets

PARTIAL STROKE VALVE TEST APPARATUS

This invention relates to an emergency valve shutdown system having an integrated test facility.

In oil, gas, petroleum and power industries, emergency shutdown of a process must be provided for under certain fault conditions.

An emergency shutdown system (ESD) is usually implemented by pneumatically controlled shut-off valves, which generally remain open whilst the process is operating safely. These valves are usually only closed when an emergency shutdown is required or for maintenance. Often processes operate for months or even years without shutting down. As the shutdown valves are operated infrequently there is a high possibility that they will stick or freeze when operation is required, thus resulting in a dangerous condition if an emergency shutdown has been requested.

This problem can be alleviated by providing redundancy for increased availability. However, it is still desirable to have a system for testing the valves individually for potential problems to be identified in order to avoid failure when an emergency shutdown is required.

Partial stroke valve test systems, where a valve is partially closed, in order to confirm that it is not stuck in an open position has recently been developed.

However, in general valve test systems are retro fitted to existing power plants, and a problem with such known systems is that there is usually complex wiring required to in order to facilitate the signal required to monitor the valves.

This invention provides a simplified valve test system which can be retro fitted with less complex wiring than known valve test system.

According to the invention there is provided an apparatus for testing emergency shutdown valves in a process industry comprising: a valve having a plurality of limit switches each limit switch arranged to indicate that the valve has reached a corresponding one of a plurality of predetermined valve positions; a valve monitor module arranged to send a signal to said valve to initiate movement of said valve and to receive feedback relating to said limit switches; wherein said feedback is provided via a single feedback signal between the valve and the valve monitor module.

In a preferred embodiment of the invention the predetermined valve positions are fully closed, partially closed and fully open.

Preferably each limit switch closes a path through one of a plurality of resistors arranged in parallel to provide a discrete valued voltage in dependence upon the number of limit switches which are closed.

It is an advantage if the valve monitor module is arranged in operation to send a signal to the valve to terminate the test if said feedback signal indicates a one of said plurality of predetermined positions has been reached or if a predetermined time limit is reached. This allows the test to terminate in the event that the valve has become stuck in an open or partially open position.

Embodiments of the invention will now be described, by way of example only, with reference to the accompanying drawings, in which:

FIG. 1 schematically illustrates an industrial process having an emergency shutdown system (ESD);

FIG. 2 schematically illustrates a valve;

Figure 1:
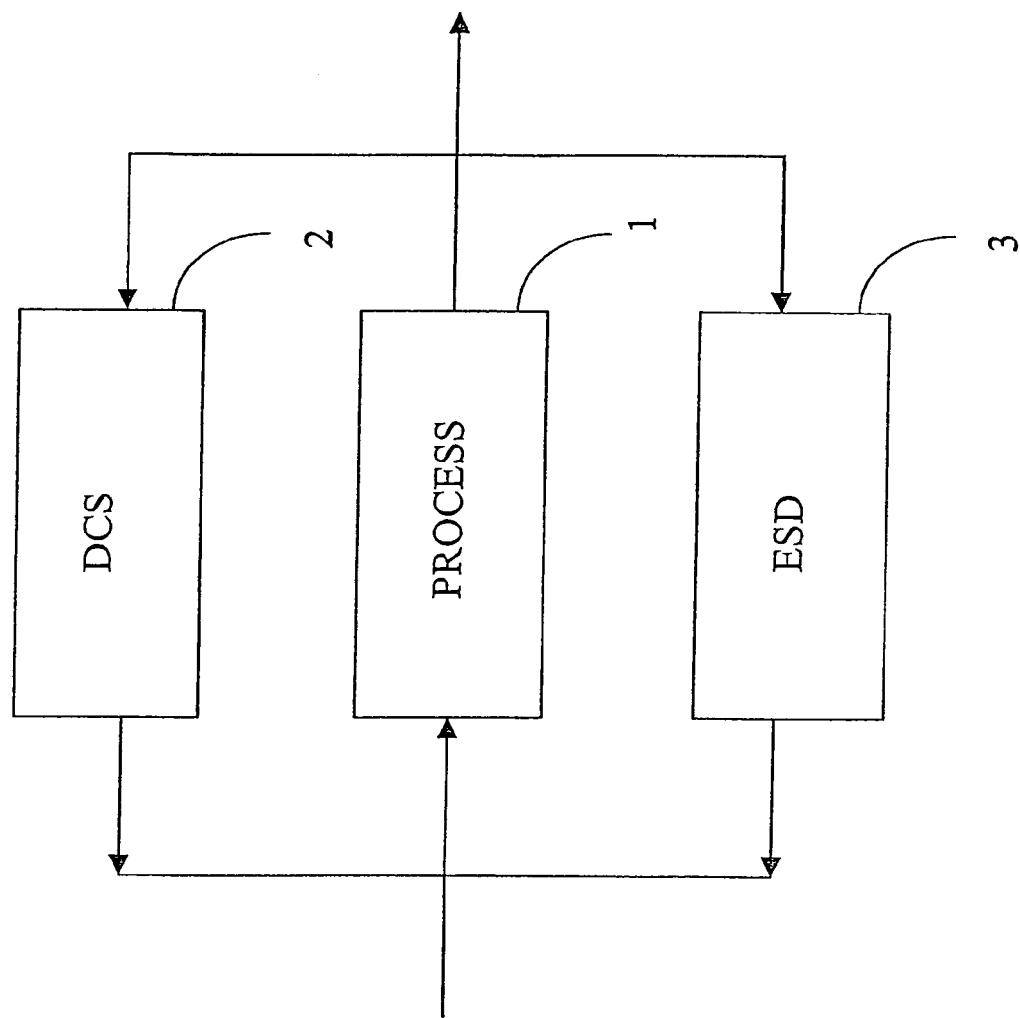

Referring now to FIG. 1, an industrial process 1, for example a process in an oil, gas, petroleum or power plant, is controlled by a distributed control system (DCS) 2. The most common cause of failure in such a process is failure of a sensor in the DCS system 2, or failure of a valve controlled by the DCS 2. An ESD 3 is used to shut down the process 1 in case of a failure. The ESD 3 in most cases must use different sensors and valves to those used by the DCS 2.

The ESD 3, is activated only rarely, sometimes not for months of even years. The valves are mechanical devices, they can stick, they can corrode, the actuators can fail, to name but a few possible fault conditions. Such fault conditions are covert (i.e. hidden) which means that they are not detected unless it is actually required to use the valve. It is possible to provide duplicate valves in series (or parallel depending on the application) in order to reduce the risk, but the cost of duplication is high, and if the reason for the fault is systematic rather than random, and if one valve has failed it is highly likely that a similar valve will also have failed under similar circumstances. Therefore it is desirable to be able to test the valves. Clearly it is undesirable to have to stop the process; in large plants actually shutting down the process can prove extremely expensive particularly where the process is required to operate at a constant temperature. Therefore partial stroking solutions have been developed, where safety shutdown valves are partially closed, in order to test their ability to close sufficiently reliably in order to meet safety specifications, without completely closing the valve.

Figure 2:
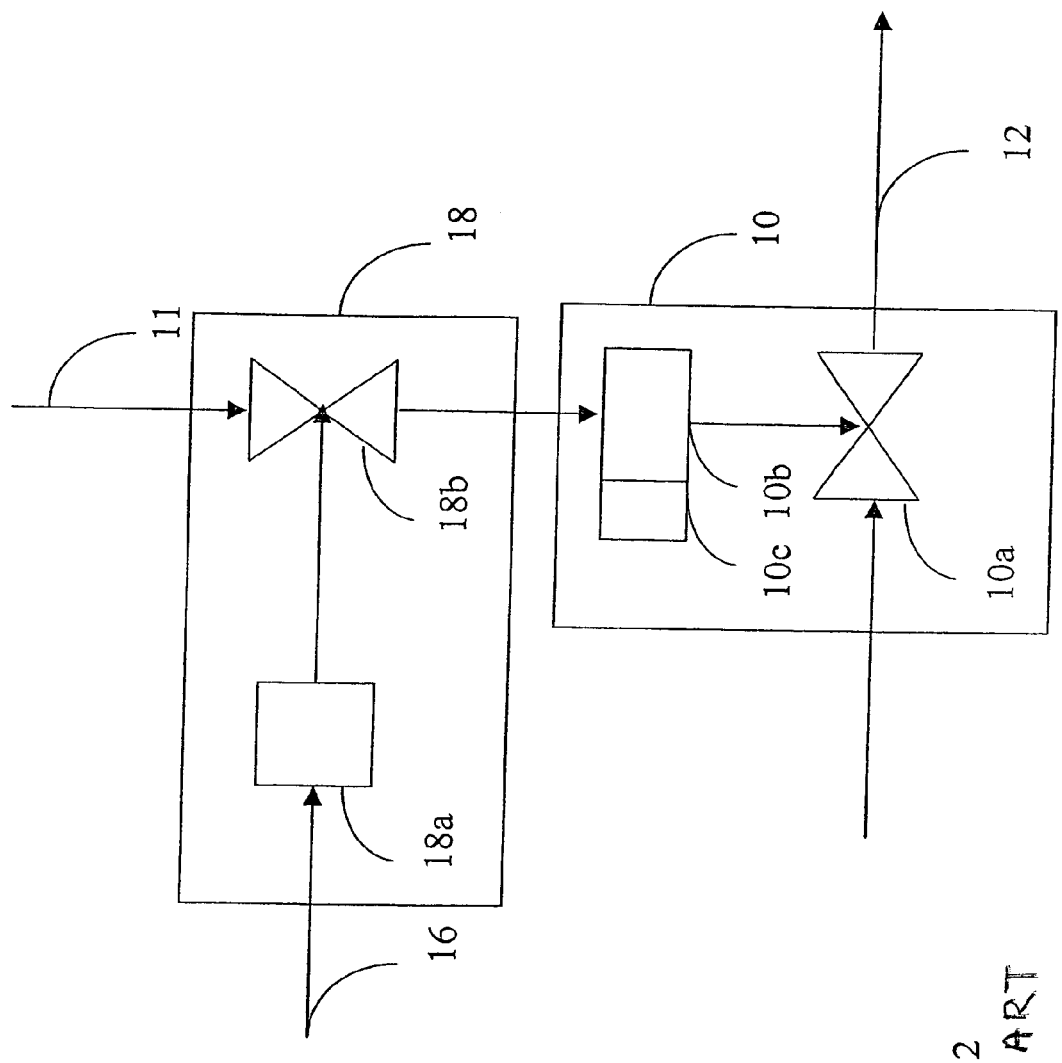

FIG. 2 illustrates a valve of the type typically used in process industries. A pneumatic valve 10 comprises a valve 10a and a piston/cylinder unit 10b. The valve 10 arranged in a pipeline 12 is arranged to close the pipeline when activated. The valve 10a is held open by pressurised air applied via a fluid line 11 to the piston/cylinder unit 10b. The valve 10a might equally well be controlled by any other gas or fluid. The valve 10b is designed to be closed by a metal spring 10c in the event that the pressure fails, so that in principal the pneumatic valve 10 should fail safe. The air is applied to the pneumatic valve 10 via a solenoid valve 18. The solenoid valve 18 comprises a solenoid 18a and a valve 18b. The solenoid 18a controls the valve 18b in response to an electrical signal applied to the solenoid 18a via a control line 16.

A number of faults can occur in the above described valve system, the solenoid valve 18 may fail or the pressure valve 10 may fail. For example, the solenoid 18a may have a faulty coil, the valve 18b may seize, the piston/cylinder unit 10b may seize, the spring 10c may be broken to name by a few potential problems.

Most of the above mentioned faults are more likely to occur where there is no regular movement of the valves, and are undetected during normal operation.

In the past such valves were tested crudely, for example, by placing an object (e.g. a piece of wood) in the valve 10a so that it could not actually shut down the process, and controlling the solenoid 18a to cause the valve 18b to prevent the supply of pressurised fluid to the pressure valve 18. Clearly this practice is quite dangerous, and would stop a genuine shutdown in the event of an emergency during the test. In fact it has been known for the object to be left in place after the test completes thus meaning in a real emergency in the future the process could not be shut down.

Clearly it is desirable for a test regime to not prevent a genuine emergency shut down, nor to cause a spurious shutdown.

Figure 3:
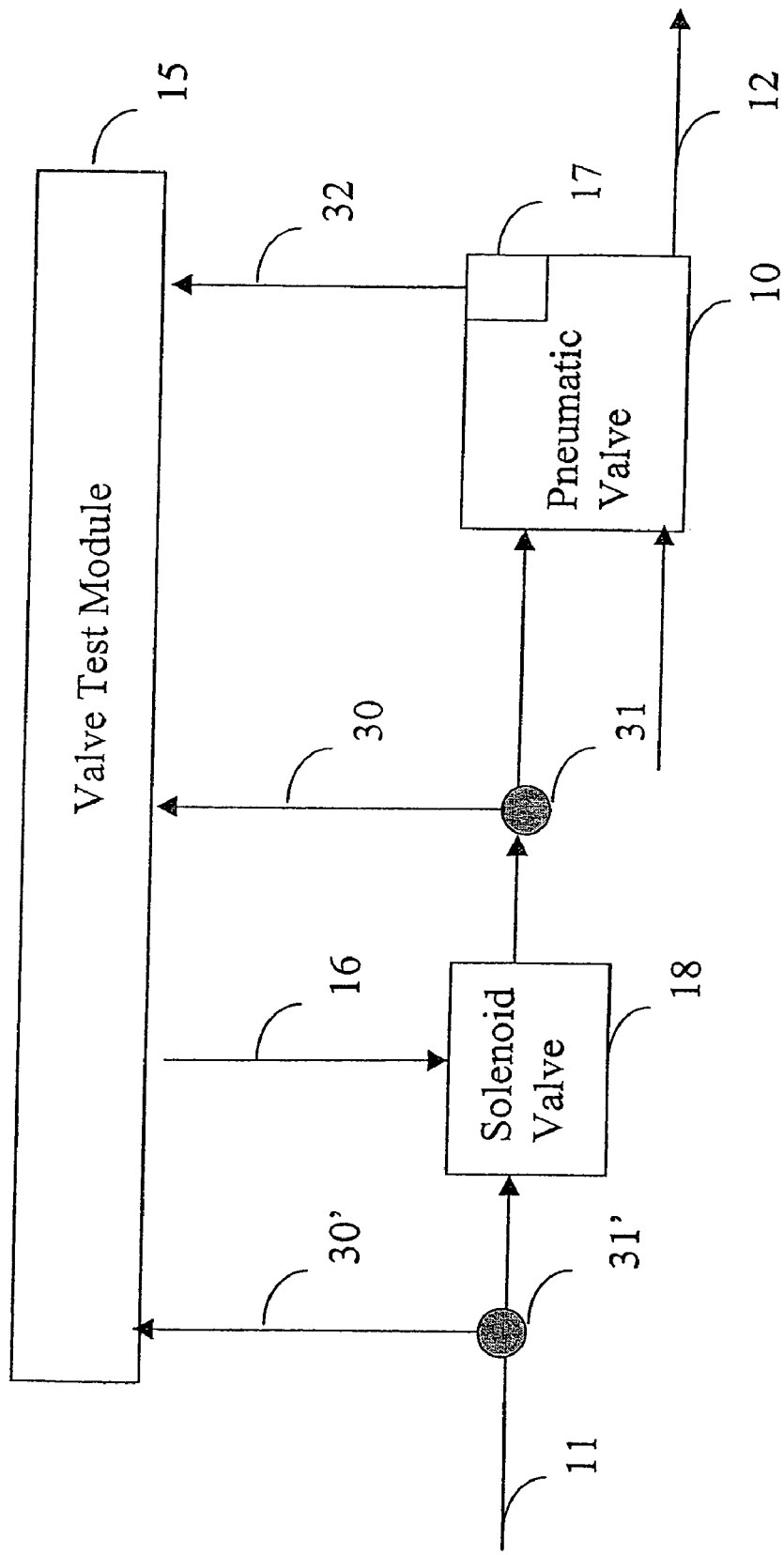
FIG. 3 illustrates a partial stroke valve test system.

More sophisticated test systems are now used whereby the solenoid 18a is controlled to cause the valve 18b to prevent the supply of pressurised fluid to the pressure valve 18. Movement of the valve 18b, and of the pressure of the fluid in the fluid line 11 is monitored. The valve is not allowed to close completely, hence such systems are referred to as partial stroke valve test systems FIG. 3 illustrates a partial stroke valve test system. A valve test module 15 is used to control a valve test regime. The module 15 sends a signal to the solenoid valve to shut off the pressurised fluid to the fluid line 11. A pressure transmitter 31 monitors the resulting pressure in the fluid line 11. A further pressure transmitter 31' may be used to monitor the pressure in the fluid line 11 before the solenoid valve 18. Loss of pressure result in the pneumatic valve 10 closing. A limit switch 17 indicates to the module 15 when the pneumatic valve 10 has partially closed (for example by 10%. If the valve has not reached the limit switch 17 within a predetermined time limit then the solenoid valve 18 is reenergized and the fluid is reapplied to fluid line 11.

Every so often it is necessary to monitor valve during a full shutdown. One advantage of fitting such monitoring facilities is that the valves can be monitored during a real emergency shutdown, if one should occur, and a planned shutdown need not be carried out as well.

Figure 4:
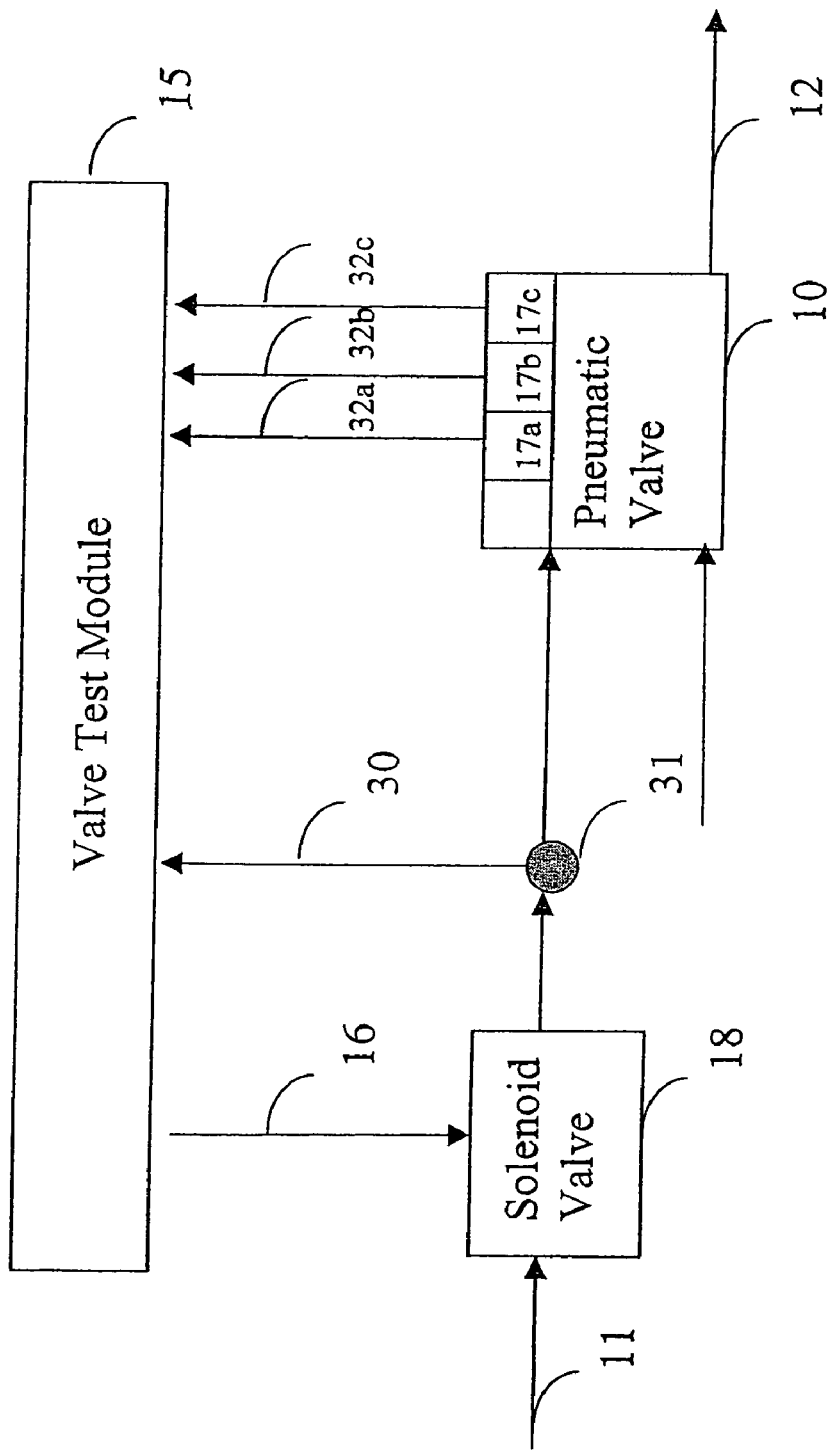
FIG. 4 illustrates a partial stroke valve test system having a plurality of limit switches.

In this instance useful to have timing information from more than one limit switch but this involves more feedback paths as illustrated in FIG. 4 which shows fully closed limit switch 17a, partially closed limit switch 17b, and fully open limit switch 17c. Timing information from more than one limit switch is useful for creating a profile of how the valve shuts down if the time each limit switch is reached can be recorded. However, the introduction of more feedback signals is not ideal when such valve monitor systems are being retrofitted to existing industrial processes, and thus introduces the need for more wires to be routed.

Figure 5:
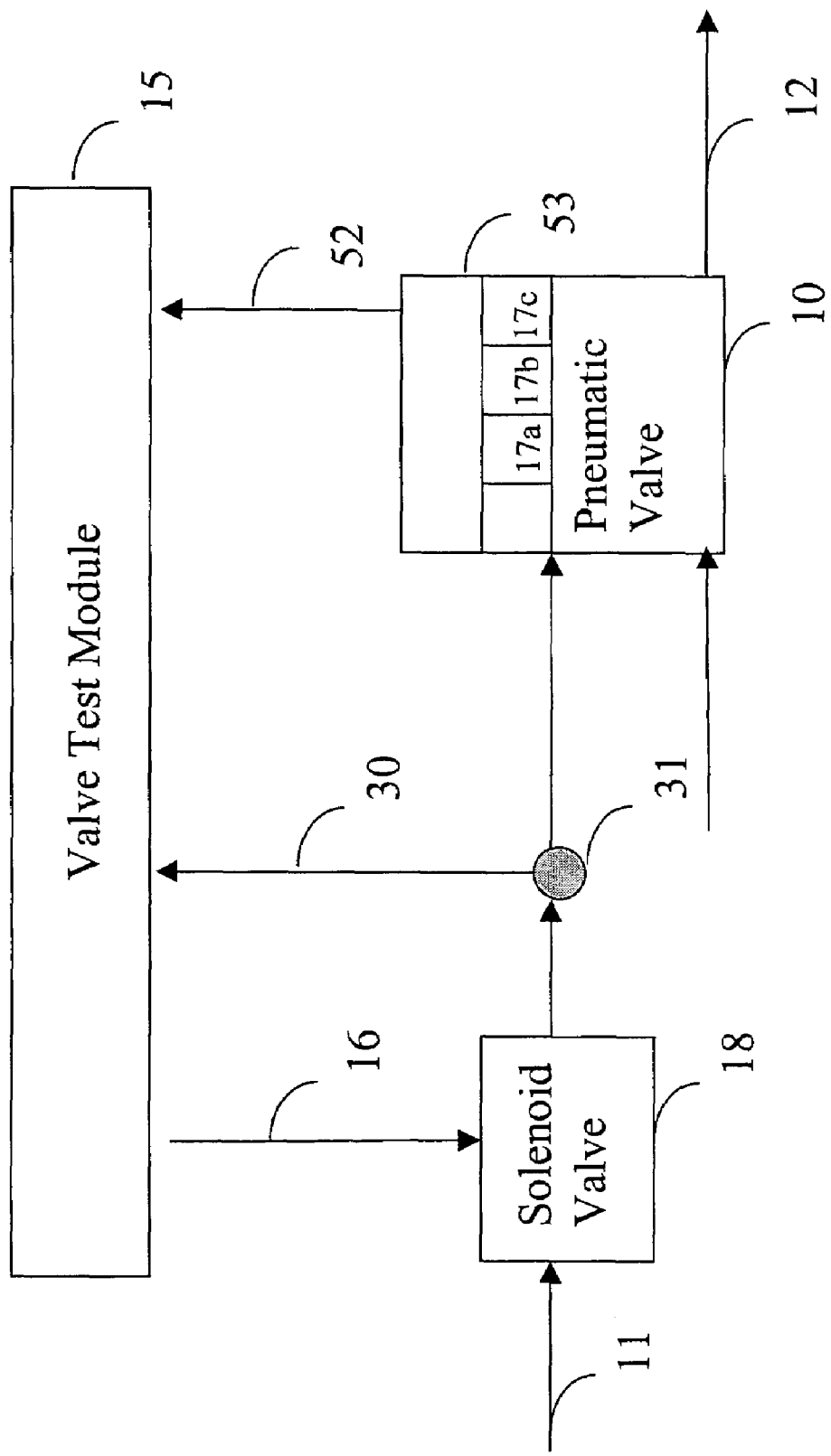
FIG. 5 illustrates a partial stroke valve test system according to the invention.

FIG. 5 illustrates a partial stroke valve test system in which circuit 53 generates a single discrete valued signal 52 from the plurality of limit switches 17a, 17b, 17c.

Figure 6:
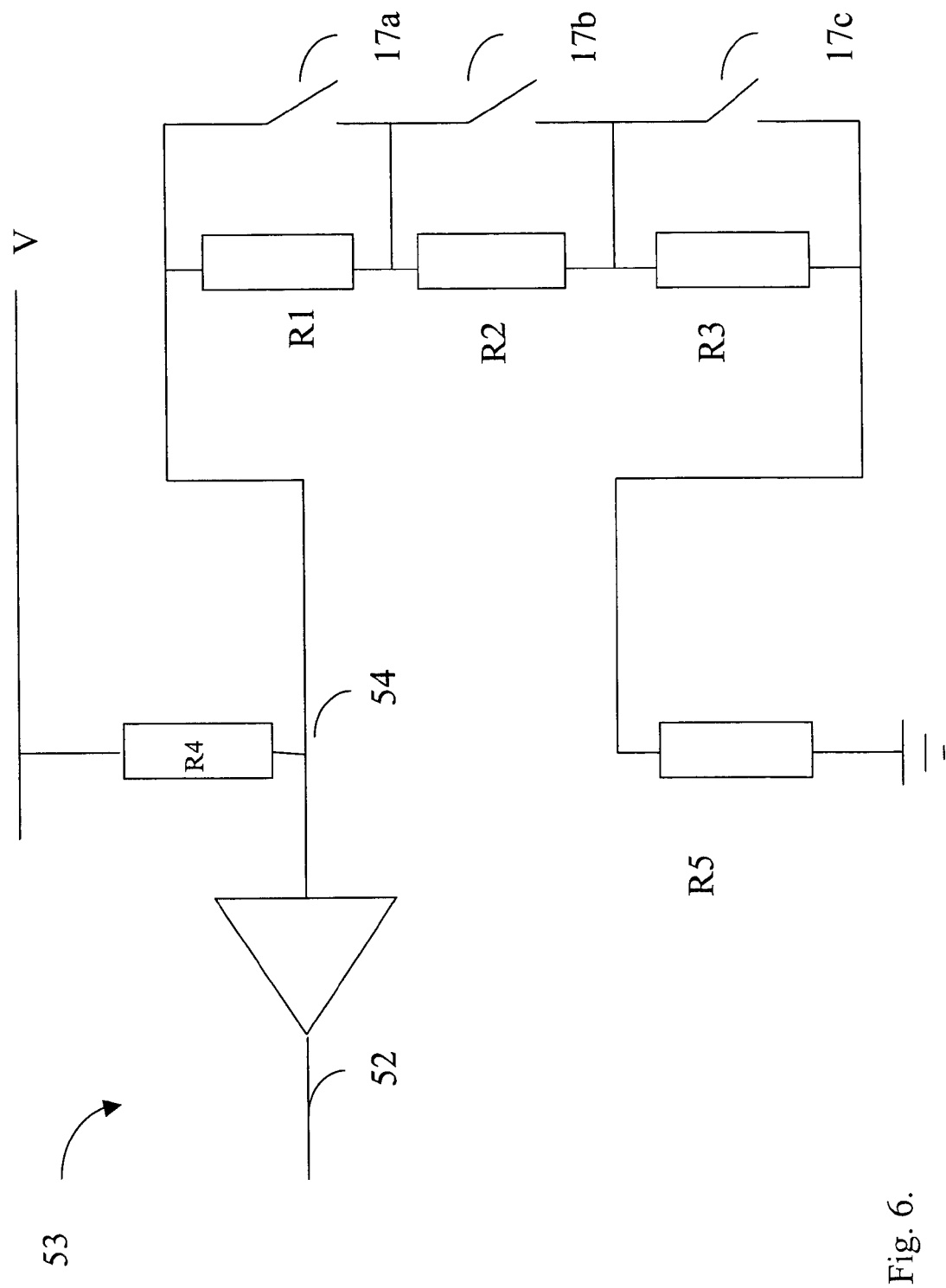
FIG. 6 illustrates a circuit for generating a single signal from a plurality limit switch signals.

FIG. 6 illustrates one embodiment of circuit 53 in more detail. Limit switches 17a, 17b, and 17c are connected in parallel with resistors Rl, R2 and R3 respectively. The voltage level at 54 is dependent upon how many of the limit switches are closed and upon the values of resistors Rl, R2, R3, R4 and R5 and upon the value of voltage V.

For example if limit switch 17c is closed the voltage level at 54 will be:

$$V_{54}=((R1+R2+R5)/(R1+R2+R4+R5))*V$$

If limit switches 17a and 17b are closed then the voltage level at 54 will be:

$$V_{54}=((R3+R5)/(R3+R4+R5))*V$$

If all three limit switches 17a, 17b, 17c are closed then the voltage level at 54 will be:

$$V_{54}=((R5)/(R4+R5))*V$$

It is possible to select the resistance values such that the voltage level at 54 is indicative of precisely which limit switches are closed. In this embodiments of the invention the voltage level V is set to be equal to 24V and the resistance values are set to be equal to R1=1500 Ω, R2=750 Ω, R3=375 Ω, R4=1500 Ω, R5=375 Ω

Figure 7:
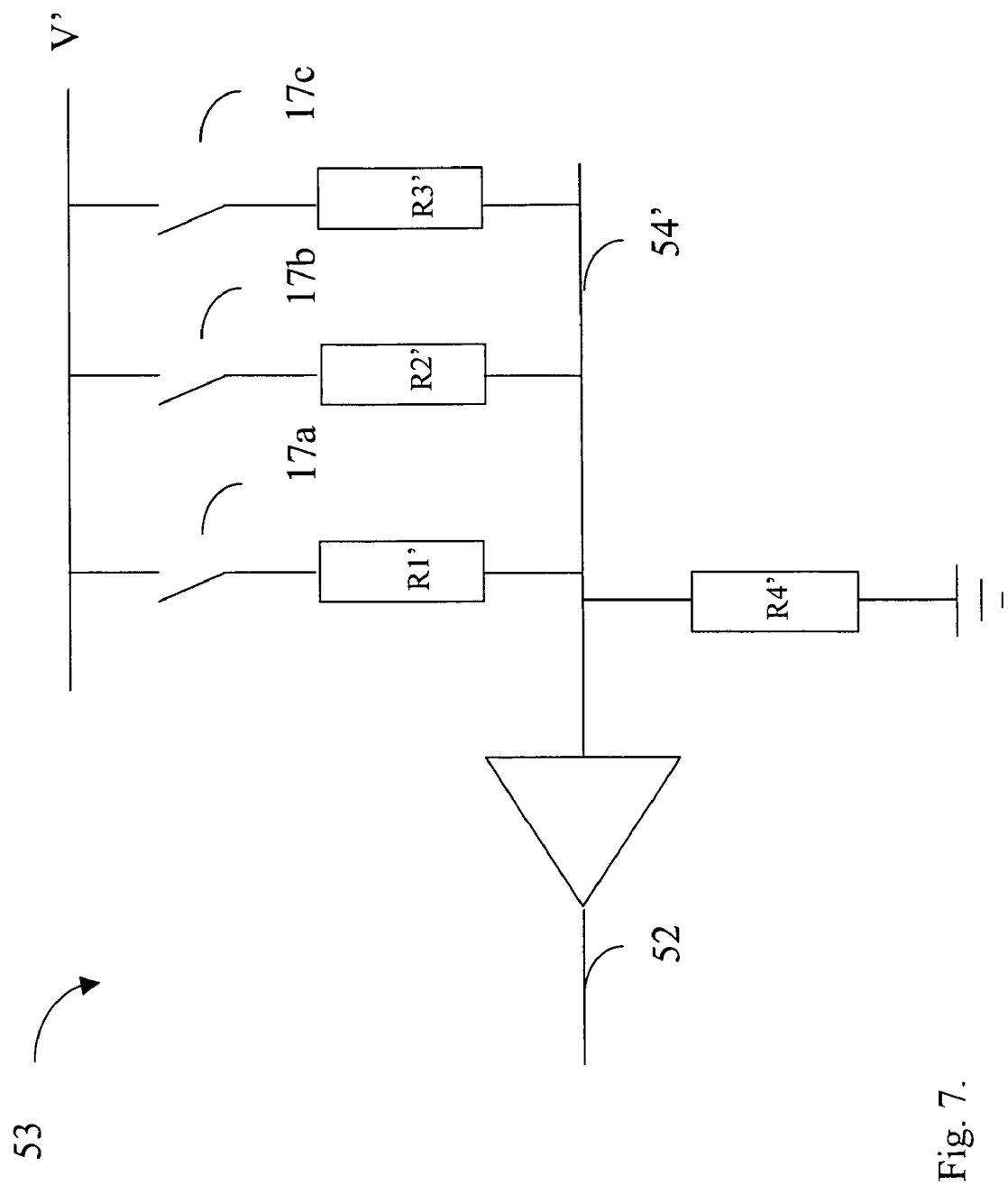
FIG. 7 illustrates an alternative embodiment of a circuit for generating a single signal from a plurality limit switch signals.

FIG. 7 illustrates an alternative embodiment where limit switches are connected to a power supply V' via resistors R1', R2' and R3'. The voltage level at 54' is dependent upon how many of limit switches 17a', 17b' and 17c' are closed, and upon the values of resistors R1', R2', R3', and R4', and upon the value of the voltage V'.

For example if limit switch 17c' is closed the voltage level at 54' will be:

$$V'_{54}=(R4'/(R4'+R'3))*V'$$

If limit switches 17a' and 17b' are closed then the voltage level at 54' will be:

$$V'_{54}=(R4'/(R4'+R23))*V' \text{ where } R23=(R2'*R3')/(R2'+R3')$$

If all three limit switches 17a', 17b', 17c' are closed then the voltage level at 54 will be:

$$V'_{54}=(R4'/(R4'+R123))*V$$

where R123=(R'1*R2'*R3')/(R1'+R2'+R3')).

It will be appreciates that other circuit configurations will work equally well.

The position of the valve can therefore be monitored by the valve test module 15 by monitoring the voltage level on the single feedback signal 52.

Although this invention has been described with reference to pressure (pneumatic) valves, it will be understood by those skilled in the art that the invention is equally applicable to shut down valves which are solely electrically operated.

The invention claimed is:

1. An apparatus for testing emergency shutdown valves in a process industry comprising:
   a valve having a plurality of limit switches each limit switch arranged to indicate that the valve has reached a corresponding one of a plurality of predetermined valve positions, wherein each of said plurality of limit switches closes a path through one of a plurality of resistors arranged in parallel to provide a discrete valued voltage in dependence upon a number of limit switches which are closed;
   a valve monitor module arranged to send a signal to said valve to initiate movement of said valve and to receive feedback relating to said limit switches;
   wherein said feedback is provided via a single feedback signal between the valve and the valve monitor module.

2. An apparatus according to claim 1, in which the predetermined valve positions are fully closed, partially closed and fully open.

3. An apparatus according claim 1, in which the valve is a pneumatic valve.

4. An apparatus according to claim 1, in which the valve monitor module is arranged in operation to send a signal to the valve to terminate the test if said feedback signal indicates a one of said plurality of predetermined positions has been reached or if a predetermined time limit is reached.

* * * * *